United States Patent
Dokoupil

(10) Patent No.: US 6,739,938 B2
(45) Date of Patent: *May 25, 2004

(54) MAGNETIC LEVITATION DEVICE WITH MECHANICAL STABILIZATION, ESPECIALLY FOR MODELS, TOY, OR DESIGN OBJECTS

(76) Inventor: Hans Dokoupil, Uhlandstrasse 4, 73342 Bad Ditzenbach (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/133,727

(22) Filed: Apr. 26, 2002

(65) Prior Publication Data

US 2002/0123294 A1 Sep. 5, 2002

Related U.S. Application Data

(62) Division of application No. 09/446,576, filed as application No. PCT/DE98/01911 on Jul. 9, 1998.

(30) Foreign Application Priority Data

Jul. 9, 1997 (DE) .......................................... 197 29 398

(51) Int. Cl.$^7$ ............................................... A63H 33/26
(52) U.S. Cl. ....................................... 446/129; 446/133
(58) Field of Search ................................ 446/129, 131, 446/132, 133, 134

(56) References Cited

U.S. PATENT DOCUMENTS

| | | | | |
|---|---|---|---|---|
| 3,196,566 A | * | 7/1965 | Littlefield | 449/129 |
| 3,955,315 A | * | 5/1976 | Goodman | 446/133 |
| 4,178,707 A | * | 12/1979 | Littlefield | 40/426 |
| 4,901,456 A | * | 2/1990 | Cotutsca | 40/427 |
| 5,052,968 A | * | 10/1991 | Lodrick, Sr. | 446/134 |
| 5,842,902 A | * | 12/1998 | Liff | 446/130 |
| 6,413,138 B1 | * | 7/2002 | Dokoupil | 446/129 |

* cited by examiner

*Primary Examiner*—Derris H. Banks
*Assistant Examiner*—Faye Francis
(74) *Attorney, Agent, or Firm*—Friedrich Kueffner

(57) ABSTRACT

The invention relates to a magnetic suspension device with mechanical stabilization, for use especially with models, toys or desingn objects. The aim of the invention is to provide a simple end economical device which allows for an object to be suspended at a relatively great height in a permanent and stationary manner and without apparent support. To this end the weight (4) of an object (1) is overcome by uncontrolled magnetic repulsion (5) and the position of the suspended object (1) is stabilized by means of mechanical tensile forces (6) which are transmitted from the suspended object (1) downwards to the lower body (2) by, for example, thin threads (7). This invention allows for the magnetic suspension of, for example, model airplanes or design objects.

16 Claims, 2 Drawing Sheets

MAGNETIC LEVITATION DEVICE WITH MECHANICAL STABILIZATION, ESPECIALLY FOR MODELS, TOY, OR DESIGN OBJECTS

This application is a division of Ser. No. 09/446,576 filed Dec. 22, 1999, filed as PCT/DE98/01911 filed Jul. 9, 1998.

BACKGROUND OF THE INVENTION

1. Field of the Invention

This invention relates to a magnetic levitation device, in which an article like a toy, model or design object attains a magnetic levitation state that is mechanically stabilized.

2. Description of the Related Art

As already known in the art, it is not possible to let a ferromagnetic body float freely and in a stabilized state in the six degrees of freedom by employing permanent magnets or unregulated electromagnets only. For this reason, additional stabilizing devices are used for several apparatus that apply unregulated magnetic forces to support a body. (Dr. rer. nat. Jung Volkhard: Magnetisches Schweben (Magnetic Levitation). Springer-Verlag, Berlin, Heidelberg, New York, 1988, Page 26), (Prof. Dr. Schweitzer Gerhard: Magnetlager (Magnetic Bearings. Springer-Verlag, Berlin, Heidelberg, New York, 1993, Page 4.

Thus, in the case of permanent magnet bearings, stabilization with mechanical supports is known in the art (Prof. Dr. Schweitzer Gerhard: Magnetlager (Magnetic Bearings). Springer-Verlag, Berlin, Heidelberg, New York, 1993, Page 86).

In the field of permanent magnet levitation railways, it is known to apply wheels or guiding rollers and rails for mechanical stabilization. (Dr. rer. nat. Jung Volkhard: Magnetisches Schweben (Magnetic Levitation) Springer-Verlag, Berlin, Heidelberg, New York, 1988, Pages 38–40).

Furthermore, several magnetic levitation devices are known, in which contactless levitation is attained by means of unregulated magnetic forces. Certain high-speed magnetic levitation trains achieve this state through the so-called electrodynamic levitation, though only at a higher traveling speed. (Dr. rer. nat. Jung Volkhard: Magnetisches Schweben (Magnetic Levitation). Springer-Verlag, Berlin, Heidelberg, New York, 1988, Page 63). Physical experiments showing that a disc made of a superconducting material can float contactless are known. In this case, the disadvantage lies in having to cool down the superconductor to very low temperatures.

Moreover, a technical skill-testing toy is known in the form of a permanent magnet made as a gyroscope that is manually impelled into fast rotation and then allowed to float contactless for only a few minutes in an unregulated magnetic field, in which the rotation contributes to a short stabilization until the rotational velocity is reduced by the friction with air and the gyroscope topples down. (U.S. Pat. No. 5,404,062), (Professional Journal: Proceedings of the Royal Society of London, "The Levitron: an adiabatic trap for spins", 1996, Band A 452, Pages 1207–1220), (Trademark: "Levitron").

Contactless floating devices that apply regulated magnetic forces for magnetic levitation and for stabilizing are also known. This so-called electromagnetic levitation is used, for example, in several magnetic levitation trains (Dr. rer. nat. Jung Volkhard: Magnetisches Schweben (Magnetic Levitation). Springer-Verlag, Berlin, Heidelberg, New York, 1988, Page 41), (Prof. Dr. Schweitzer Gerhard: Magnetlager (Magnetic Bearings). Springer-Verlag, Berlin, Heidelberg, New York, 1993, Pages 5–8). The disadvantage in this case concerns the required complex regulating systems comprising sensors, control circuits and electromagnets.

SUMMARY OF THE INVENTION

The object of the invention is to create a simple and cost-effective device, in which an object floats in a permanent, stationary and apparent freely manner at a relatively great height.

According to the invention, the weight of an object that floats over a bottom body at a height is overcome by an unregulated magnetic repulsion force that acts between the bottom body and the object floating above, and the floating state is stabilized through at least a mechanical tension force that is transmitted from the floating object downwards by means of at least a thin stretched member, for instance, by means of a thin string towards the bottom body.

The advantages of the invention are in that unregulated magnetic repulsion forces can be generated easily and cost-effectively by means of permanent magnets and the application of tensional forces for stabilizing the floating state enables the use of a stabilization device with minimum material requirement, for instance—thin strings, so that the stabilizing device is hardly visible, and thus achieving an apparently free floatation.

In accordance with a further development of the invention, the magnetic repulsive force is generated by magnetic like-poles arranged opposite to each other.

Advantageously, a bottom magnet made of a hardferrite material is used for generating the repulsive force.

Advantageously, a top magnet made of a neodymium-iron-boron is used for generating the repulsive force.

According to another feature, the stability of the floating state is appropriately attained.

In a further development of the invention, a high degree of stability of the floating state is attained through the convergence of stabilizing strings into a hole in the bottom body. Advantageously, a high tensile-strength material is used for the thin stretched member.

In a further development of the invention, the floating object is a decorative article.

In a further development of the invention, the floating object is made as a model or toy.

In a further development of the invention, the bottom body is a diorama.

Figure 1:
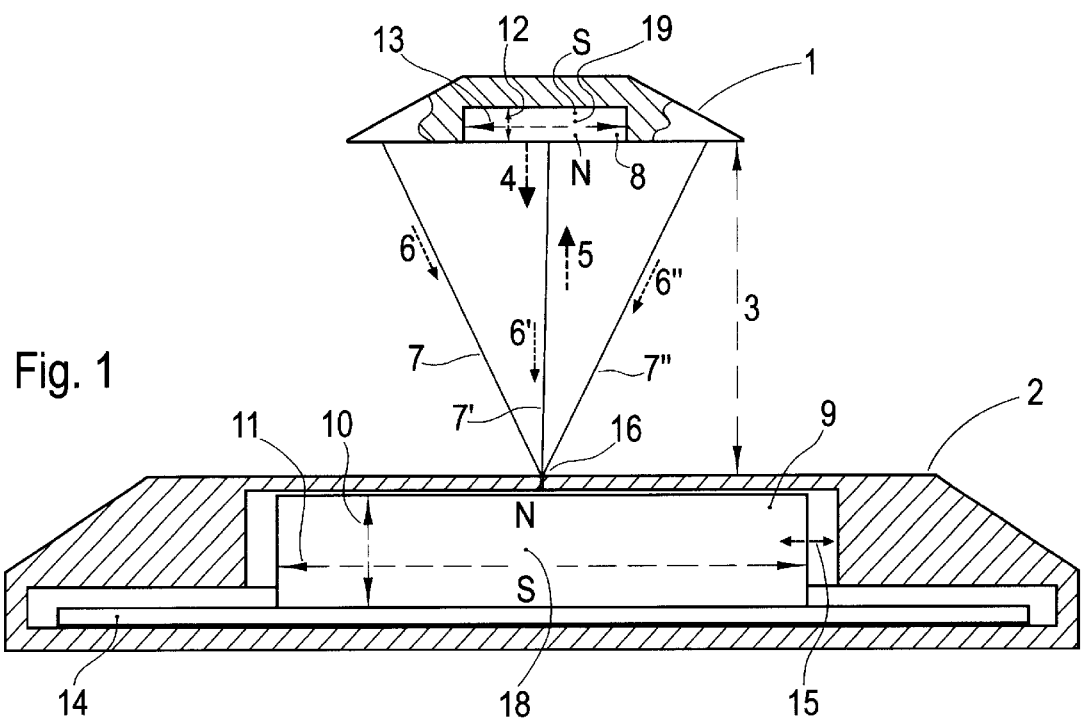
FIG. 1 is a schematic illustration of the magnetic levitation device according to the present invention.

In the embodiment shown in FIG. 1, the invention consists of a bottom body (2) in which a bottom disc-like permanent magnet (9) made of anisotropic hard-ferrite is located. The height (10) of this round magnet (9) is about 0.2 its diameter (11), and the round magnet (9) is magnetized (18) in this direction of the height (10). The round magnet (9) is placed on a larger, round iron plate (14). This bottom magnet system, consisting of the permanent magnet (9) and iron plate (14) is horizontally (15) and restrictedly displaceable relative to the bottom body (2). At a floating height (3) above the bottom body (2), that corresponds approximately to 0.7 times the diameter (11) of the bottom round magnet (9), a light object (1) floats and contains a top flat permanent magnet (8) made of neodymium-iron-boron magnetic material. This top magnet (8) is also magnetized (19) in the direction of its height (12), but is substantially smaller than the bottom magnet (9). Both north poles of the bottom and top magnets (9 and 8) lie horizontally opposite each other, thus producing a magnetic repulsive force (5) directed opposite to the weight (4) of the floating object (1). Along the outer perimeter of the floating object (1), three strings (7, 7', 7") are fastened, equidistantly. These strings (7, 7', 7") transmit tensional forces (6, 6', 6") downwards to the bottom body (2) and are hence under tension. All three strings (7, 7', 7") extend through a middle bore (16) in the bottom body (2), where they are fastened.

The purpose of the bottom magnet (9) is to generate an upwardly spread magnetic field, where the object (1) can float. The iron plate (14) is in principle not necessary, although it substantially improves the efficiency of the bottom magnet (9) by aligning the magnetic flux. A stabilized floating state of the object (1) in which the object (1) floats at a height (3) above the bottom magnet (9) is achieved because the magnetic repulsive force (5) is greater than the weight (4) of the object (1) and the strings (7, 7', 7") that pull the floating object (1) downwards are under tension. This pretension of the strings (7, 7', 7") prevents the object (1) from rotating and toppling down. The convergence of the stabilization strings (7, 7', 7") into a passage point (16) on the bottom body (2) produces a high degree of stability of the flotation state and facilitates that the object (1) executes movements while floating. The floating position of the object (1) can be influenced by horizontal shifting (15) of the bottom magnet (9) relative to the bottom body (2) with the string-passage point (16).

Figure 2:
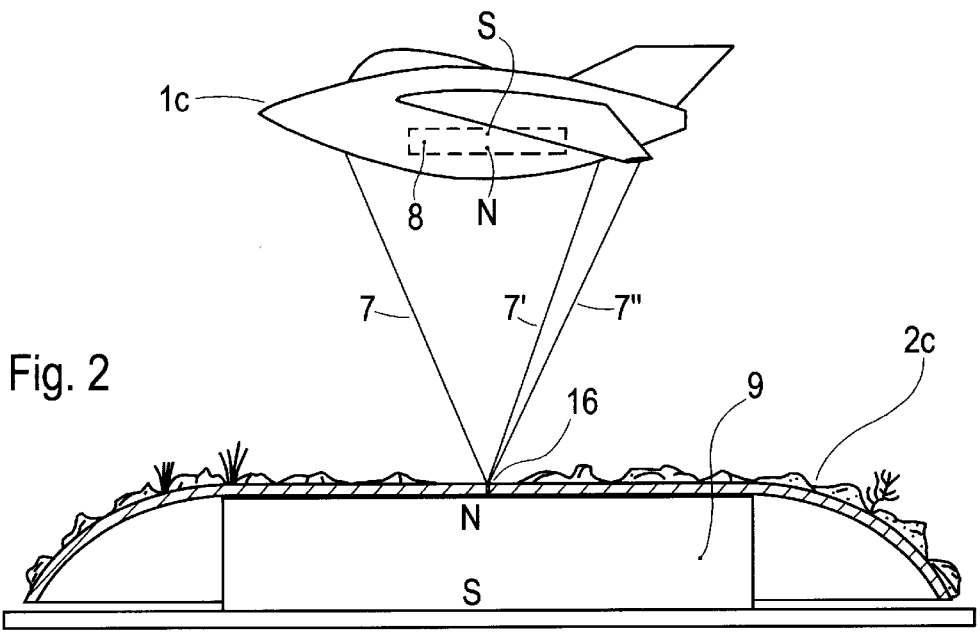
FIG. 2 is a schematic illustration of a second embodiment of the magnetic levitation device according to the present invention.

Another embodiment of the invention is depicted in FIG. 2. In this version the bottom body is made as a diorama (2c) and depicts a landscape in model scale. Above this diorama (2c) that conceals the bottom magnet (9), a model (1c) floats, wherein the top magnet (8) is contained in the model's fuselage. Stabilization of the floating state is ensured by means of three thin strings (7, 7', 7"), fastened on the model (1c) and converging downwards into a bore (16) inside the diorama (2c). If the stabilizing strings (7, 7', 7") are made thinner than 0.04 mm, the strings (7, 7', 7") are nearly invisible and create an impression of a freely floating model (1c).

Figure 3:
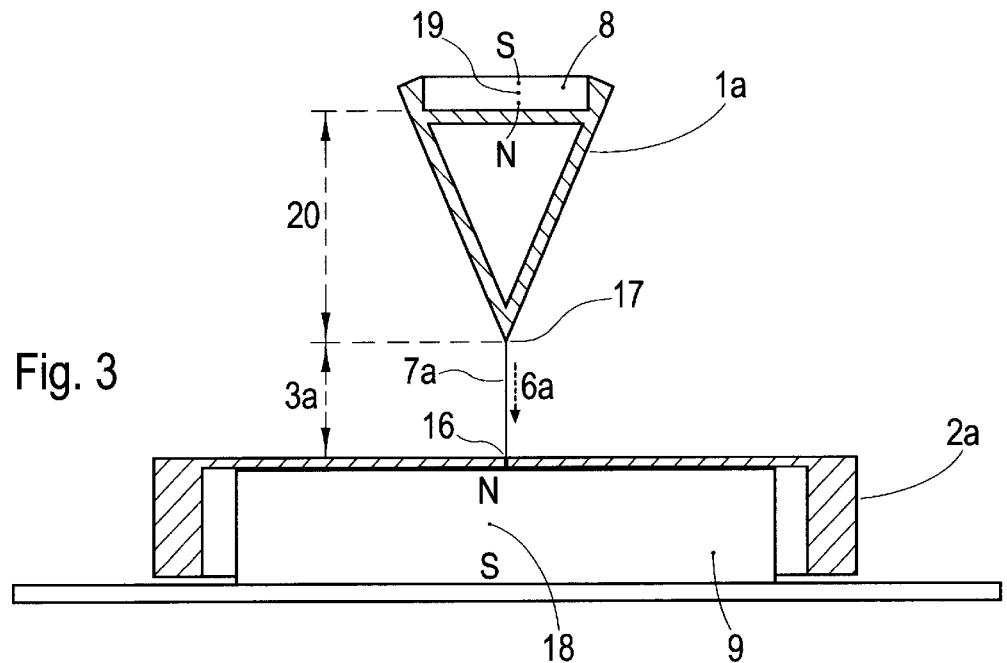
FIG. 3 is a schematic illustration of a third embodiment of the magnetic levitation device according to the present invention.

Another embodiment of the invention is depicted in FIG. 3. In this embodiment, the fastening point (17) is located on the floating object (1a) for the stabilizing string (7a) at a distance (20) below the top magnet (8). The stabilizing tensile force (6a) in this case is directed downwards and transmitted by a single string (7a) towards the string passage point (16) on the bottom body (2a).

Figure 4:
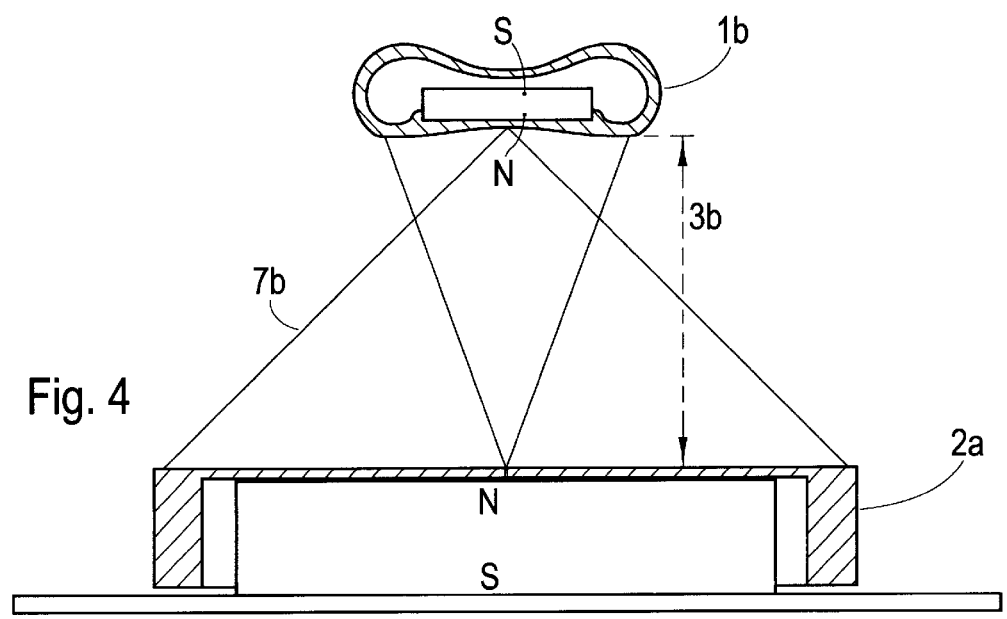
FIG. 4 is a schematic illustration of a fourth embodiment of the magnetic levitation device according to the present invention.

Another embodiment of the invention is depicted in FIG. 4. In this embodiment, additional stabilization strings (7b) start from the floating object (1b) and are directed obliquely downwards and outwards to the bottom body (2a). This additional stabilization facilitates a greater floatation height (3b).

What is claimed is:

1. A floating device comprising:

a bottom body, a bottom magnetic unit, wherein the bottom magnetic unit comprises at least one bottom magnet, a top object, the top object having at least one top magnet, wherein a weight force of the top object is overcome only by an uncontrolled magnetic repulsive force acting between the bottom body and the top object such that the top object floats above the bottom body at a height, and a mechanical tensional force arrangement for stabilizing a position of the top object, the mechanical tensional force arrangement comprising at least one thin stretched member connected to the top object at a vertical distance below the top magnet and extending downwardly to the bottom body, whereby the at least one thin stretched member is configured to transmit a mechanical tensional force from the top object in a direction downwards to the bottom body.

2. The floating device according to claim 1, wherein the bottom magnet is movable relative to the bottom body, so that a position of the top object can be influenced by a horizontal shifting of the bottom magnet relative to the bottom body.

3. The floating device according to claim 1, wherein the bottom magnet comprises one or more permanent magnets.

4. The floating device according to claim 3, wherein the permanent magnet is made of a hardferrite material.

5. The floating device according to claim 1, wherein the bottom magnet has a height which is smaller than a width thereof.

6. The floating device according to claim 1, wherein the bottom body fully or partially consists of the bottom magnet.

7. The floating device according to claim 1, wherein the top magnet comprises one or more permanent magnets.

8. The floating device according to claim 7, wherein the permanent magnet is neodymium-iron-boron.

9. The floating device according to claim 1, wherein the top magnet has a height which is smaller than a width thereof.

10. The floating device according to claim 1, wherein the top object fully or partially consists of the top magnet.

11. The floating device according to claim 1, wherein the at least one thin streched member is at least partially comprised of a material setected from the group consisting of a fiber, a plastic fiber, a synthetic fiber, a polyamide fiber, a polyaramide fiber, a polyethylene fiber, a glass fiber, a carbon fiber, a string, a thin wire, and a stainless steel wire.

12. The floating device according to claim 1, wherein at least two thin stretched members are comprised of an electrically conductive material, so that electric energy can be conducted between the bottom body and the top object.

13. The floating device according to claim 1, wherein the top object is a carrier for other things.

14. The floating device according to claim 1, wherein the top object is a model or toy.

15. The floating device according to claim 14, wherein the model or toy is an aircraft or a spaceship.

16. The floating device according to claim 1, wherein the bottom body is a diorama.

* * * * *